(12) United States Patent
Morris et al.

(10) Patent No.: US 6,204,971 B1
(45) Date of Patent: Mar. 20, 2001

(54) GLASS MICROSPHERES FOR USE IN FILMS AND PROJECTION SCREEN DISPLAYS AND METHODS

(75) Inventors: Geoffrey P. Morris, White Bear Lake, MN (US); Jacqueline C. Rolfs, River Falls, WI (US); Leo A. Meyer, St. Paul, MN (US); Robert S. Moshrefzadeh, Oakdale, MN (US); Hsin-Hsin Chou, Woodbury, MN (US); Billy J. Tompkins, Russelville; Thomas N. Davis, Fayette, both of AL (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/311,909

(22) Filed: May 14, 1999

(51) Int. Cl.$^7$ ..................................................... G02B 27/10
(52) U.S. Cl. ......................... 359/619; 359/453; 359/538; 359/540; 359/541; 428/149; 428/402; 501/34; 501/77
(58) Field of Search .................................. 359/619, 538, 359/540, 541, 542, 546, 452, 453; 501/33, 34, 75, 77; 428/149, 402

(56) References Cited

U.S. PATENT DOCUMENTS

| | | |
|---|---|---|
| 2,150,694 | 3/1939 | Morey . |
| 2,378,252 | 6/1945 | Staehle et al. . |
| 2,606,841 | 8/1952 | Armistead . |
| 2,610,922 | 9/1952 | Beck ........................................ 501/34 |
| 2,687,968 | 8/1954 | Beck ........................................ 501/34 |
| 2,794,301 | 6/1957 | Law et al. . |
| 2,977,850 | 4/1961 | Vanstrum . |
| 3,022,182 | 2/1962 | Cleek et al. . |
| 3,034,406 | 5/1962 | McKenzie et al. . |
| 3,150,947 | 9/1964 | Bland . |
| 3,177,083 | 4/1965 | de Vries . |
| 3,193,401 | 7/1965 | Alexander et al. . |
| 3,222,204 | 12/1965 | Weber et al. . |
| 3,294,558 | 12/1966 | Searight et al. ........................ 501/34 |
| 3,294,559 | 12/1966 | Searight et al. ........................ 501/77 |
| 3,306,757 | 2/1967 | d'Adrian ................................ 501/34 |
| 4,082,427 | * 4/1978 | Nakashima .......................... 359/540 |
| 4,367,919 | 1/1983 | Tung et al. .......................... 359/538 |
| 5,563,738 | 10/1996 | Vance .................................. 359/614 |
| 5,674,616 | 10/1997 | Balcar .................................. 428/402 |
| 5,716,706 | 2/1998 | Morris .................................. 428/402 |
| 5,853,851 | 12/1998 | Morris .................................. 428/149 |

FOREIGN PATENT DOCUMENTS

WO 96/33139 10/1996 (WO) ........................... C03C/3/062
WO 98/45753 10/1998 (WO) .

OTHER PUBLICATIONS

Bloss, "An Introduction to the Methods of Optical Crystallography," Holt, Rinehart and Winston; New York, NY; 47–55 (1961).

"Chrome Complexes: Quilon," Zaclon Incorporated Brochure, located on–line at www.zaclon.com, 1999.

"Volan Bonding Agent: Coupling Agents for Glass Fiber Reinforced Laminates," Du Pont Brochure, pp. 1–4 (1981).

* cited by examiner

*Primary Examiner*—Loha Ben
(74) *Attorney, Agent, or Firm*—William D. Miller

(57) ABSTRACT

Glass microspheres and rear projection screens containing glass microspheres, which combine a desirable index of refraction (preferably, no greater than about 1.70) and low levels of defects (e.g., bubbles, visible haziness, frostiness, or opacity, substantially nonspherical shapes) upon formation are provided. Also provided is a coating method of placing microspheres on a film for use in a rear projection screen.

20 Claims, 4 Drawing Sheets

GLASS MICROSPHERES FOR USE IN FILMS AND PROJECTION SCREEN DISPLAYS AND METHODS

BACKGROUND

Rear projection screen displays based on glass microspheres embedded in an opaque matrix as described in U.S. Pat. No. 2,378,252 (Staehle) have been growing in popularity for various uses, such as in large format televisions. A rear projection screen is a sheet-like optical device having a relatively thin viewing layer that is placed at an image surface of an optical projection apparatus. Such a screen makes visible a real image focused by a projection apparatus onto the image surface. The viewing layer is typically planar corresponding to the image surfaces produced by a projection apparatus. Other shapes are possible if the image surface of the projection apparatus is not planar. The screen is intended to act as a filter to attenuate, block, or diffuse light which is not part of the projected image, and to transmit from its rear side to its front side that light which is part of the projected image. In this way it enables the viewer to see the projected image when looking at the front side of the screen.

A well-known type of rear projection screen is a thin, light diffusing layer such as a frosted or translucent glass surface, which may be produced by etching, sandblasting, or otherwise roughening a smooth glass surface. The translucent surface limits the visibility of objects behind the screen. The screen must, however, be sufficiently light transmissive to allow the projected image, which is focused precisely on the translucent surface, to be viewed from the front side of the screen. Since the translucent surface scatters light, the image is viewable from a range of viewing angles. Screens that are merely translucent suffer, however, from a tendency to strongly reflect ambient light incident on the front side, thereby causing fading, or washout, of the projected image. This problem is particularly severe if the background or ambient light is bright.

An approach to reducing the effects of ambient light while still maintaining an acceptable level of projected image light is to attach an array of closely packed glass microspheres (i.e., beads) to a substrate by an opaque polymeric binder. The glass microspheres and substrate are both light transmissible (i.e., transparent). The glass microspheres act as lenses to collect projected light from the rear of the screen and focus it to relatively small spots, near the surfaces of the microspheres. The foci are approximately in the areas where the microspheres contact the front support layer.

Because the transparent microspheres contact the front of the substrate, they exclude most of the opaque binder material from the space between the microspheres and their contact areas on the substrate. This forms an optical aperture between each microsphere and the substrate. The area surrounding each optical aperture is opaque, and preferably black, due to the opaque binder material in the microsphere interstices. As a result, ambient light incident in these areas is absorbed. Thus the front side of the screen appears black, except for the light transmitted through the microspheres.

The appearance of such screens is highly sensitive to the quality and placement of the glass microspheres used. Microspheres that are of incorrect size, are not spherical, or are broken, nicked, scratched, or otherwise defective can create a variety of visible defects, variously called graininess, scintillation, sparkles, speckle, punch through, or simply spots. These defects are particularly troubling when the screen is used, for example, as a computer monitor, where the need for seeing a high level of detail is likely to lead the user to scrutinize the screen closely, from a short distance, for long periods of time.

Generally, the size of the microspheres required for such products are less than about 150 $\mu$m and for maximum "brightness" their index of refraction should be less than about 1.8, and preferably about 1.45 to about 1.75. Higher index microspheres can be employed as taught in U.S. Pat. No. 5,563,738 (Vance); however, to achieve similar brightness values special optical layers are required which adds additional processing steps and cost. It is also taught that it is "necessary to eliminate out-of-round, wrong-sized, and discolored microspheres" in order to obtain a uniform appearance.

A number of processes have been devised for the production of spherical glass bodies in small sizes. These generally involve the free suspension of particles in a hot zone for a time and at a temperature sufficient to permit each particle to be drawn into a spherical shape by surface tension. For economical commercial production of glass microspheres it is important that the viscosity of the glass be relatively low at a reasonable melting temperature (for example, no greater than about 1350° C.). Generally, additions of alkali and fluorine are used to reduce the melting temperature; however, the use of fluorine creates an environmental concern as it is readily lost during the melting process and the addition of alkali typically results in microspheres that are hydrophobic and tend to clump and be poorly flowing.

U.S. Pat. No. 2,610,922 (Beck) describes glass compositions suitable for the production of glass microspheres with an index of refraction of 1.64 to 1.74. Compositions that are fluorine-free tend to form fiber when directly atomized from the melt; however, the use of fluorine in the glass results in hazardous emissions which are undesirable.

U.S. Pat. No. 5,716,706 (Morris) describes glass microspheres with a refractive index of 1.6 to 1.9. These glasses are designed to meet the refractive index, chemical durability, and strength requirements of pavement marking applications. These compositions do not readily form small microspheres (e.g., about 150 $\mu$m or less) of acceptable quality (e.g., low levels of bubbles) due to the relatively high viscosity at useful microsphere forming temperatures (e.g., about 1350° C.).

U.S. Pat. No. 3,306,757 (Duval d'Adrian) describes formulations that can be used to prepare glass microspheres in the desired refractive index range; however, these compositions either require excessive temperatures (e.g., greater than about 1350° C.) or are of such a nature that they tend to form fibers when directly atomized from the melt.

U.S. Pat. No. 2,794,301 (Law et al.) describes free-flowing alkali metal oxide containing glass microspheres that are treated with an acidic gas vapor upon manufacture to insolubilize the surface alkali. This process creates undesirable environmental emissions which requires costly control.

Thus, there is a need for free flowing glass microspheres prepared from compositions that have a relatively low melting points and lend themselves to the economical manufacture of glass microspheres. Preferably, there is a need for glass forming compositions that have a low viscosity (e.g., that of vegetable oil) at temperatures no greater than about 1350° C. and form microspheres with an index of refraction of no greater than about 1.70, which also have a low level of defects.

SUMMARY OF THE INVENTION

The present invention provides glass microspheres and rear projection screens containing glass microspheres, which combine a desirable index of refraction (preferably, no greater than about 1.70, more preferably, about 1.50 to about 1.70, and most preferably, about 1.60 to about 1.70) and low levels of defects (e.g., bubbles, visible haziness, frostiness, or opacity, substantially nonspherical shapes) upon being formed (i.e., "as produced" without subsequent sorting to pick out the defects). Preferably, a population of microspheres as produced has less than about 15% defects. The terms "microsphere," "bead," and "spherical" are used herein for rounded unitary glass elements, which may not be perfect spheres.

Preferably, the glass microspheres are visibly transparent (i.e., they transmit a sufficient amount of light such that they are suitable for use in beaded rear projection screen displays). Microspheres that are suitable for use in displays are preferably less than about 150 μm in diameter. Preferably, the microspheres include, on a theoretical oxide basis and based on the amounts of the starting materials, greater than about 5 wt-% of an alkali metal oxide selected from the group of $Na_2O$, $K_2O$, $Li_2O$, and mixtures thereof, no greater than about 40 wt-% $SiO_2$, and no less than about 10 wt-% $TiO_2$. For specific advantage, the microspheres preferably include $Li_2O$, typically in an amount of at least about 0.25 wt-% $Li_2O$.

For particularly preferred glass microspheres, the components of the glass microspheres are as follows: no greater than about 40 wt-% $SiO_2$; no less than about 10 wt-% $TiO_2$; no less than about 5 wt-% $B_2O_3$; no less than about 20 wt-% of an alkaline earth modifier selected from the group of BaO, SrO, and mixtures thereof; and greater than about 5 wt-% of an alkali metal oxide selected from the group of $Na_2O$, $K_2O$, $Li_2O$, and mixtures thereof, preferably with the proviso that $Li_2O$ is present. For significant lack of defects, ease of melting, and desirable refractive index, the glass microspheres of the present invention include: no greater than about 31 wt-% $SiO_2$; no less than about 15 wt-% $TiO_2$; no less than about 10 wt-% $B_2O_3$; no less than about 25 wt-% of an alkaline earth modifier selected from the group of BaO, SrO, and mixtures thereof; and no less than about 10 wt-% of an alkali metal oxide selected from the group of $Na_2O$, $K_2O$, $Li_2O$, and mixtures thereof.

As is common in the glass art, the components are described as oxides, which is the form in which they are presumed to exist in the completed glass microspheres of the invention, and which correctly account for the chemical elements and their proportions in the glass forming composition. The starting materials used to make the glass may be some chemical compound other than an oxide, such as barium carbonate, but the composition becomes modified to the oxide form during melting of the ingredients. Thus, the compositions of the glass microspheres of the present invention are discussed in terms of a theoretical oxide basis.

The formulations described herein are reported on a theoretical oxide basis based on the amounts of starting materials used. These values do not necessarily account for fugitive materials (e.g., fugitive intermediates) that are volatilized during the melting and spheroidizing process. Typically, boria ($B_2O_3$) and alkali metal oxides are somewhat fugitive. Thus, if a finished product were analyzed there could be as much as a 5% loss of the original amount of boria and/or alkali metal oxide added to make the final microspheres. However, herein, as is conventional, all components of the final microspheres are calculated based on the amounts of starting materials and the total weight of the glass forming composition, and are reported in weight percents of oxides based on a theoretical basis.

The present invention also provides a film comprising a plurality of glass microspheres disposed on a substrate and embedded in an opaque matrix; wherein the glass microspheres: have an index of refraction of no greater than about 1.70; comprise, on a theoretical oxide basis based on the amount of starting materials, greater than about 5 wt-% of an alkali metal oxide selected from the group of $Na_2O$, $K_2O$, $Li_2O$, and mixtures thereof (and preferably, $Li_2O$ is present), no greater than about 40 wt-% $SiO_2$, and no less than about 10 wt-% $TiO_2$; and as produced have less than about 15% defects in a population. Such films can be used in a rear projection screen.

Also provided is a rear projection screen that includes a plurality of refracting microspheres as described herein bound in optical contact with a substrate and embedded in an opaque matrix. Various embodiments of such screens can incorporate the microspheres of the present invention.

In yet another embodiment, the present invention provides a method of making a film for use in a rear projection screen, which may or may not utilize the glass microspheres described herein. This method includes providing a substrate having an opaque matrix disposed thereon; and applying glass microspheres from a rolling bank of microspheres onto the opaque matrix under conditions effective to produce microspheres in optical contact with the substrate and embedded in the opaque matrix. Preferably, applying glass microspheres from a rolling bank includes: contacting the opaque matrix on the substrate with sufficient glass microspheres to form multiple layers of glass microspheres between the substrate and a pack roll; and pressing the glass microspheres into the opaque matrix on the substrate. Preferably, and advantageously, a monolayer of embedded microspheres is formed, wherein the apex of a majority of the microspheres, and preferably, substantially all the microspheres, are in direct contact with the substrate underlying the opaque matrix.

BRIEF DESCRIPTION OF THE DRAWINGS

FIG. 2b shows an alternative embodiment of the screen shown in FIG. 2a;

DETAILED DESCRIPTION OF PREFERRED EMBODIMENTS

Figure 1:
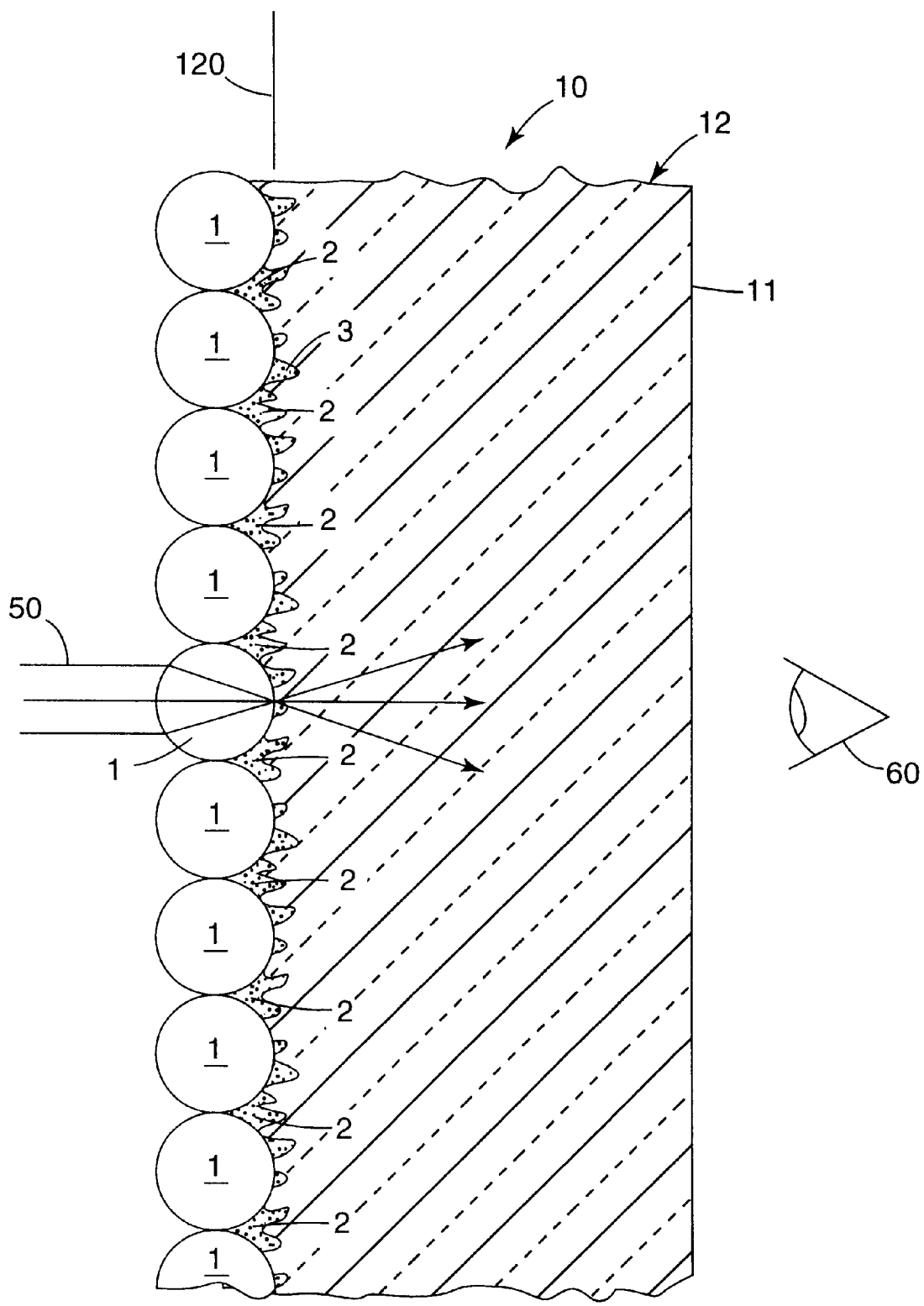
FIG. 1 shows one embodiment of a screen containing microspheres of the present invention.

The present invention provides certain glass forming compositions that contain relatively high levels of alkali metal compounds (preferably, greater than about 5 wt-% on a theoretical oxide basis based on the amount of starting material in the glass forming composition), which can be used to prepare a population of microspheres with a low defect level. Significantly, the problems encountered in the past with poor flow behavior of compositions that contain such high levels of alkali metal compounds can be overcome by methods described herein.

Preferably, the desired index of refraction of the glass microspheres is no greater than about 1.70, and more preferably it is about 1.50 to about 1.70, and most preferably it is about 1.60 to about 1.70. For a screen construction containing a single layer of microspheres, the transmittance of the screen is generally maximized for a refractive index of about 1.50 to about 1.70. Thus, the microspheres of the present invention are particularly well suited for use in rear projection screens.

The components of the glass forming compositions of the invention each generally contribute different properties or degrees of a property in proportion to their amount in the composition, and combine with one another to achieve the unique properties of glass microspheres of the present invention. For at least the components present in larger amounts, there is usually no sharp change in properties with small changes in proportions, and numerical ranges stated herein for such components should be understood in that context.

The components and amounts of each are chosen to provide microspheres having a relatively low index of refraction, a relatively low level of defects, and fluidity at a reasonable melting temperature (preferably, no greater than about 1350° C.). These components melt readily and form a composition that can be formed into spheres with a defect level (such as bubbles, nonspherical or opaque microspheres, and cullet) of no greater than about 15%, and preferably, no greater than about 5% as measured via optical microscopy, in a population as produced. By "as produced" it is meant that the microspheres are not sorted to pick out defects (e.g., fibers), although they may be screened to obtain the appropriate size microspheres.

Preferably, the components and amounts of each are also chosen to provide compositions with low volatility at the temperatures of operation (i.e., less than about 2 wt-% loss to vaporization at the temperatures of operation), and low toxicity. Preferably, the glass forming compositions of the present invention require no fluidizing agents for improving fluidity in the melt during the manufacturing process. If fluidizing agents are used, however, they should not be volatile. Furthermore, they should not create hazardous compounds. Thus, metal fluorides are preferably not used in the compositions of the present invention.

Silica ($SiO_2$) promotes glass formation. Too much silica, however, tends to increase the viscosity of the glass forming composition and makes it difficult to form the molten glass directly into spheres without the formation of excessive odd-shaped particles and fibers. Thus, the glass microspheres of the present invention include no more than about 40 wt-% $SiO_2$. For particularly advantageous results, the silica level is preferably about 10 wt-% to about 35 wt-%. Preferably, for a low level of bubbles no greater than about 31 wt-% $SiO_2$ is included.

The index of refraction of glass microspheres of the invention is generally increased by using increased proportions of $TiO_2$. $TiO_2$ also helps reduce the melting temperature of a $SiO_2$ based glass. Thus, no less than about 10 wt-%, preferably no less than about 15 wt-%, $TiO_2$ is included to achieve the indices of refraction sought. At amounts above about 18 wt-%, the index of refraction typically becomes too high. At amounts below about 10 wt-%; however, meltability is poor. For particularly advantageous results, the $TiO_2$ level is preferably about 14 wt-% to about 18 wt-%.

An alkaline earth modifier, such as BaO or SrO (as a whole or partial substitute for BaO), is included to improve fluidity of the glass melt during formation of the glass and increases the refractive index of the glass. At least about 20 wt-%, and preferably at least about 25 wt-%, of BaO and/or SrO, is present in the microspheres of the present invention. At amounts below about 20 wt-% in the microspheres, the glass forming composition is difficult to melt. At amounts above about 42 wt-% BaO, the refractive index of the microspheres increases to above the desired levels for use in the screens of the present invention. Thus, about 25 wt-% to about 38 wt-% is preferably used in the microspheres of the present invention.

An alkali metal oxide, such as $Na_2O$, $K_2O$, $Li_2O$, or combinations thereof, also promotes glass formation. Greater than about 40 wt-% causes the glass microspheres of the present invention to be undesirable as they become excessively hydrophilic. Too little alkali metal oxide results in poor melting behavior. Thus, preferably the alkali metal oxide content of the microspheres of the present invention is about 10 wt-% to about 35 wt-%. For reduced tendency of fiber formation during direct atomization, lithium oxide is present in the glass microspheres, preferably at a level of least about 0.25 wt-% $Li_2O$, and more preferably at a level of at least about 0.50 wt-%.

Boria ($B_2O_3$) provides improvement in the level of meltability and promotes glass formation; however, less than about 5 wt-% $B_2O_3$ is undesirable. Preferably, no less than about 10 wt-% $B_2O_3$ is included in the glass compositions of the present invention. Too much $B_2O_3$ can cause manufacturing problems, such as poor melting behavior and excessive phase separation. Thus, about 10 wt-% to about 15 wt-% is preferably used in the microspheres of the present invention.

As stated above, the glass compositions of the present invention are particularly advantageous because they do not require the use of fluidizing agents. Commonly used fluidizing agents are metal fluorides (e.g. NaF, LiF, $BaF_2$, KF), which can create hazardous emissions from the glass melt in the form of volatile HF and $SiF_4$. The presence of fluorine, a nonbridging anion, also promotes devitrification, which limits the size of glass microspheres that can be prepared from the compositions of the present invention. Thus, the glass microspheres of the present invention are advantageous because they are made without metal fluoride fluidizing agents. They are also advantageous because they preferably do not include toxic materials such as PbO.

Many other components can be included, either to contribute some specific property or to take the place of a portion of one of the other components. Generally, these other components do not total more than about 10 wt-%, preferably no more than about 5 wt-%, and more preferably no more than about 1 wt-%, of the microspheres. ZnO is an example of one possible additional component which can be added to provide meltability and fluidity to the glass melt. $Al_2O_3$ is also useful, generally in an amount of about 1 wt-% to about 5 wt-%, to contribute strength and improve chemical durability. Another useful component, although it is not desirable because of its toxicity, is $AS_2O_3$, which can be added to make the glass elements colorless and assist bubble removal. Another component that can be included in the compositions, but is not desired, is CaO; however, this is preferably present in no more than about 5 wt-%. Thus, preferred embodiments of the present invention include calcium-free or non-calcium-containing microspheres.

Colorants can also be included in the composition of the present invention. Such colorants include, for example, $CeO_2$, $Fe_2O_3$, CoO, $Cr_2O_3$, NiO, CuO, $MnO_2$, and the like. Typically, the glass microspheres of the present invention include no more than about 5 wt-%, preferably no more than about 1 wt-%, colorant. Also, rare earth elements, such as europium, can be included for fluorescence.

The glass microspheres of the present invention can also include oxides of elements that exist as impurities in certain starting materials. For example, $TiO_2$ can include impurities containing Al, Si, and K, which are incorporated into the glass. Typically, the glass microspheres include no more than a total of about 5 wt-% of such impurities.

Glass microspheres of the invention can be prepared by conventional processes. In one useful process for making microspheres the starting materials are measured out in particulate form, each starting material being preferably about 0.01 micrometer to about 50 micrometers in size, and intimately mixed together. They are then melted in a gas-fired or electrical furnace until all the starting materials are in liquid form. The liquid batch can be poured into a jet of high-velocity air. Glass microspheres and other shaped articles of the desired size are formed directly in the resulting stream. The velocity of the air is adjusted in this method to cause a proportion of the microspheres formed to have the desired dimensions. The formed glass microspheres of undesired size can be crushed and screened to assure they are in the proper range of sizes. The crushed frit is then passed through a flame having a temperature of about 1100° C. to about 1350° C. to spheriodize the particles.

Because glass forming compositions described herein are very fluid (i.e., low viscosity), they are difficult to dry frit using methods such as water cooled metal rolls, as the glass readily flows between the rolls. Therefore, water quenching is typically used; however, there are problems associated with disposal of waste water which has become contaminated with slightly soluble species such as barium and fine particulate glass. Thus, the preferred method is to dry frit the glass forming composition by direct atomization from the melt jet of high-velocity air.

The microspheres of the present invention are preferably washed with water under ambient conditions to remove alkali metal ions from the surface and subsequently applying a flow control agent. Suitable flow control agents include hydrophobic compounds such as VOLAN methacrylato chromic chloride (available from Zaclon Inc., Cleveland, Ohio) and precipitated silicas as described in U.S. Pat. No. 3,177,083 (de Vries). Typically, a flow control agent is coated on the microspheres at a coated weight of at least about 30 parts per million (ppm) and often no greater than about 500 ppm. This reduces the problems encountered in the past with poor flow behavior of compositions that contain such high levels of alkali metal compounds.

Microspheres of the invention can be incorporated into a rear projection screen display with excellent gain and contrast, although other uses are also possible. The resulting defect level results in a product that has good uniformity of appearance.

Various embodiments of rear projection screens can incorporate the microspheres described herein. For example, FIG. 1 portrays a cross-sectional view of a first embodiment of a rear projection screen according to the present invention, designated generally as 10. Transparent, refracting, glass microspheres 1 are attached to and in intimate contact with major surface 3 of transparent substrate 12. Microspheres 1 are held in place by an opaque polymeric binder material that at least partially fills interstices 2 and also is in intimate contact with surface 3. It is important that microspheres 1 be bound in optical contact with substrate 12. By this it is meant that the microspheres are held in place and that a substantial portion of the light passing through microspheres 1 will reach substrate 12 even if microspheres 1 are not in physical contact with substrate 12. According to this embodiment of the present invention, surface 3 exhibits a light randomizing property that may be created by roughening or by providing other optical inhomogeneities. Thus the inhomogeneities on surface 3 act as an optical diffuser. It is preferred that the inhomogeneities be random in nature and have a size in the range of from on the order of the wavelength of visible light to about ten times that wavelength. It is further preferred that the randomizing layer be relatively thin. It is also preferred that, apart from surface 3, substrate 12 be transparent, optically clear, and capable of transmitting optical images without significant scattering or other degradation.

In an alternative embodiment (not shown), a diffusion layer can be formed by coating an optically inhomogeneous material as a separate layer onto substrate 12 prior to application of the opaque binder and microspheres 1. The diffusion layer may include a transparent polymeric binder, applied by coating or extrusion, within which is dispersed particulate material having a refractive index different from that of the binder. The amount of light diffusion provided by this layer may be controlled by the amount and type of dispersing particulate added to the layer. It is preferred that the thickness of the diffusing layer be relatively low, but higher thicknesses may be used, provided that image resolution and other desirable image properties are not degraded to an unacceptable level. Various other embodiments are also possible that include a diffuser as long as it is placed such that light traveling through the screen will pass through the diffuser after passing through microspheres 1 but before exiting the screen.

Again referring to FIG. 1, in use, rear projection screen 10 is placed in a location substantially coincident with projected image surface 120 of a projection apparatus, oriented such that the image formed by projected light 50 is incident on microspheres 1. Viewer 60 then sees, from the front side of the screen, the projected image made visible by rear projection screen 10 after the light emerges through major surface 11 of substrate 12.

Figure 2A:
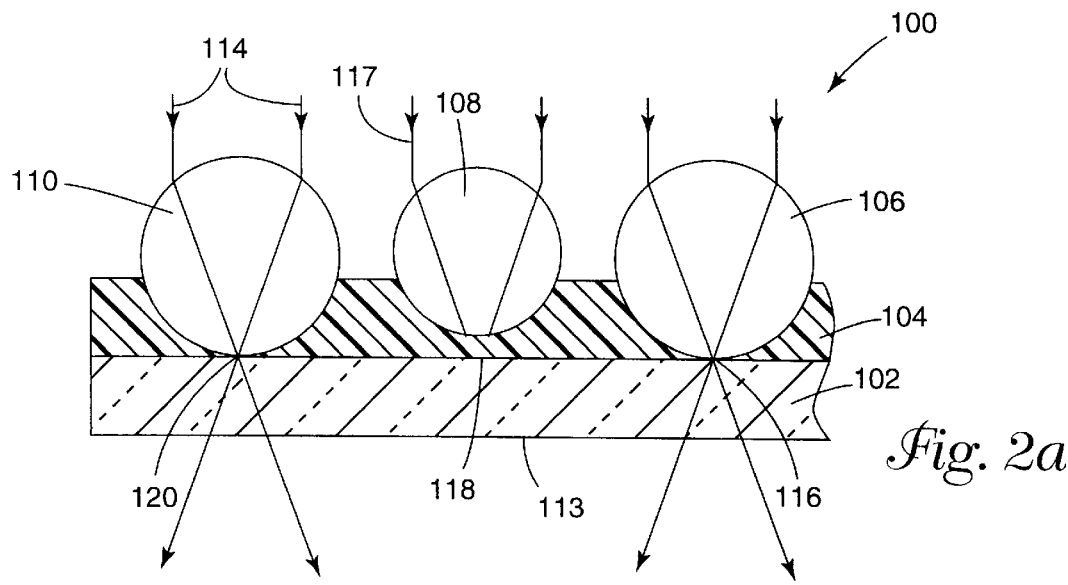
FIG. 2a shows an alternative embodiment of a screen containing microspheres of the present invention.

FIG. 2a illustrates another embodiment in which a film 100, having a substrate layer 102, is covered by an opaque layer 104. In this film the refracting microspheres 106, 108, and 110 are supported in the opaque layer 104. Image light 114 is incident on the back side of the film 100 from a source. Some of the image light 114 is refracted on passing into the microspheres 106, 108, and 110, and is directed to respective exit portions 116, 118, and 120, where the opaque layer 104 is thinnest. Generally light escapes through the exit portions 116, 118, and 120, into the substrate 102 and out to the viewing side of the film 113.

The opaque layer (referred to herein as an opaque matrix) performs a number of functions, including supporting the microspheres, defining the exit aperture of the microspheres, controlling light passing through the intersticies between microspheres and controlling ambient light. Ideally, the opacity of the material forming this opaque matrix is high in order to eliminate specular transmission of light through the intersticial areas and to absorb ambient light. However, the opacity should be low for controlling the aperture of the microspheres. The reason for this is that a substantial portion of the light passing through the exit portion of a microsphere passes through a portion of the opaque layer. In order to permit a reasonable amount of light through the exit portion, and thus increase the transmission of the film, the opaque layer should have a low opacity. Therefore, a compromise is required in the optical properties of the opaque layer in order to optimize ambient and interstitial light control at the same time as optimizing the transmission of the film.

The opaque matrix may be made from a wide variety of materials. The choice of material preferably produces suitable adhesive bonding to the microspheres, and is sufficiently opaque as described above. Preferred materials for the opaque matrix are polymeric materials that will accept colorants, such as a dye, pigment, or carbon black. Preferably, black colorants are used. It may also be a powder coating of carbon black, black dyes, opaque particles or inorganic particles, or such particles dispersed within a polymeric binding material.

Preferably, the opaque matrix is able to be coated on surface 3 (FIG. 1), for example, and held in a softened state until microspheres can be placed on the coating and pressed into contact with surface 3 (FIG. 1). A preferred such material is an acrylate loaded with carbon black to make it opaque. Various thermoplastic or thermoset, particularly, thermal or UV-curable, polymers can be used.

Substrate 12 (FIG. 1) or 102 (FIG. 2a) can be of any material that is transparent to visible light. For the embodiment shown in FIG. 1 it can be processed to form an optical diffuser on surface 3. Polymeric materials such as polymethylmethacrylate and polyethylene terephthalate (PET), and polycarbonate have been found suitable. While polymeric materials have the advantage of light weight and flexibility, glass may also be used.

Figure 2B:
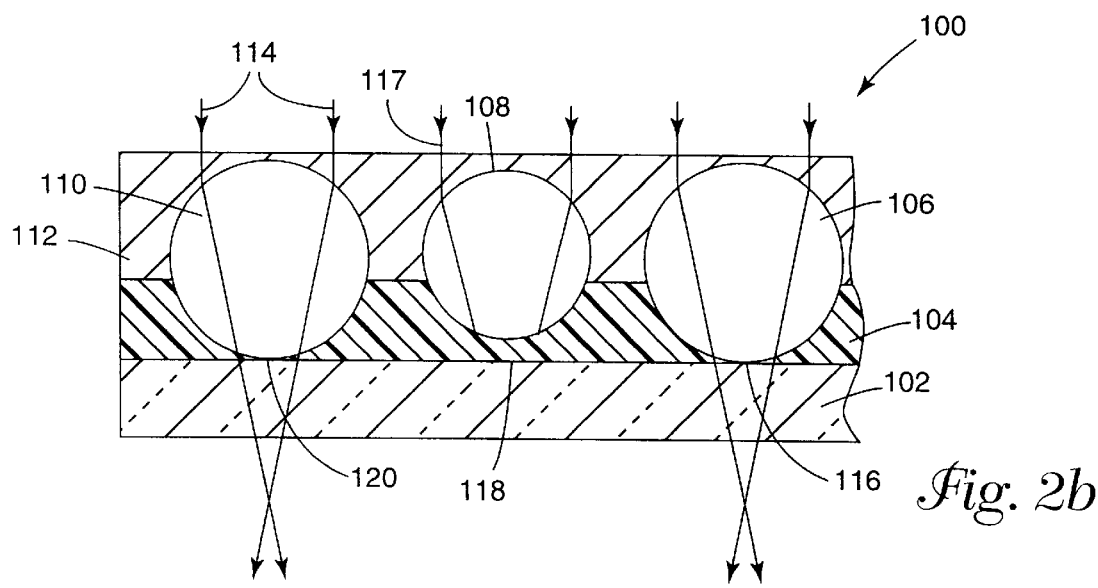

A cover layer 112 covering the microspheres 106, 108, and 110 and the opaque layer 104, as illustrated in FIG. 2b, may be used in the screens of the present invention. The cover layer 112 may be formed from any suitable transparent material, such as a polymer, sol-gel coating, and the like. Advantages provided by the cover layer 112 include protecting the microspheres, supporting the microspheres in the film, and an improved diffuse light transmission. The cover layer 112 may provide a flat outer surface upon which additional layers can be disposed, or it may conform to the surface topology of the microspheres with the effect that the radius of curvature of the microspheres is reduced.

Figure 3:
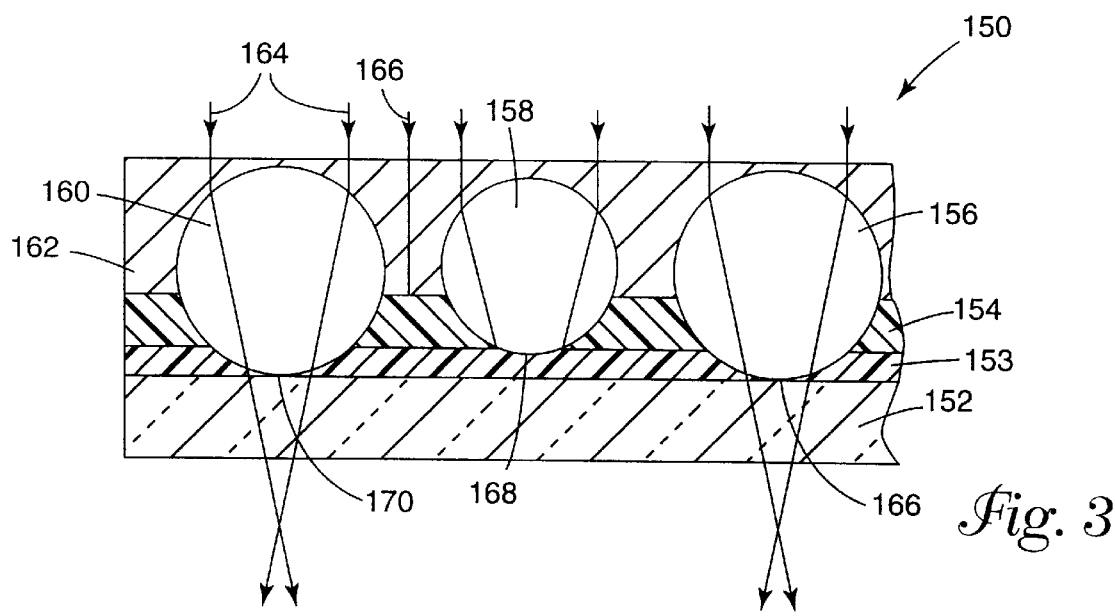
FIG. 3 shows an alternative embodiment of a screen containing microspheres of the present invention.

Another embodiment of a screen is illustrated in FIG. 3. The film 150 has a transparent substrate layer 152, on top of which is disposed a layer of optically transparent material 153. The substrate layer 152 may be formed from any suitable transparent material, including acrylic, as described above. Where the film 150 is to be flexible, the substrate layer 152 may be formed from a polyester or, if an optically isotropic material is required, from polycarbonate. The transparent material 153 may be formed by coating an optically clear polymer layer on the substrate layer 152. The polymer may be a compliant material, such as a thermoplastic or a pressure sensitive adhesive, or may be a curable clear layer, for example a polymer that is thermally curable or curable by exposure to radiation.

An opaque layer 154 overlies the layer of transparent material 153. In this embodiment, the opaque layer 154 typically has an optical density greater than 4 so that the film contrast is kept high by extinguishing interstitial light 165 passing between the microspheres 168 and 170. In this embodiment, the opaque layer 154 of the film 150 need not be used to support the microspheres. Consequently, the opaque layer 154 may be made very thin relative to the microsphere diameter.

Microspheres 156, 158, and 160 are positioned to penetrate through the opaque layer 154 and into the transparent material 153 so that their exit portions 166, 168, and 170 lie within the transparent material 153. The layer of transparent material 153 may be made to be substantially less than the radius of the microspheres, even less than about 10% of the microsphere radius, so that there is sufficient absorbing material around the lower portion of the microsphere to maintain high film contrast. The film 150 may be used either with or without a cover layer 162 covering the microspheres 156, 158, and 160, and the opaque layer 154.

The exit portions 166, 168, and 170 of the microspheres 156, 158, and 160 are located within the transparent material 153. An advantage provided by this embodiment is that, even though microsphere 158 is smaller than the adjacent microspheres 156 and 160, light exiting from the exit portion 168 propagates into the transparent material 153, and through the substrate layer 152 to the viewing side of the film. Thus, the placement of absorbing material at the output of the microsphere is avoided. The transmission aperture in the film 150 is effectively controlled by the thickness of the transparent material 153. Hence, the transmission of the film 150 is higher than the transmission of the single layer film 100.

Referring to FIG. 1 as exemplary, fabrication of the screen can be performed by first forming an optical diffuser on surface 3 of substrate 12. This can be formed by a variety of means. Sanding of PET film with 100 grit sandpaper has been found to be suitable. Other means, such as embossing, chemical etching, and casting the film onto a suitably roughened casting surface may also be used. In general, any means of fabrication suitable for forming microreplicated or other structured surfaces would be suitable for producing an optical diffuser on surface 3.

This is followed by applying an opaque material onto the substrate. The opaque material may be applied as a liquid coating, such as a polymeric material dissolved in a suitable solvent system. Alternatively, it may be extruded onto the substrate as a melted thermoplastic resin. The thickness of the layer of opaque material is determined by the volume of the interstices between microspheres. These interstices should be filled. If the opaque material is applied by a solvent based coating process, it is convenient to partially dry the coating, apply the microspheres, typically by drop coating, and press them into contact with surface 3 (FIG. 1). After the microspheres have been pressed into place, the drying of opaque material may be completed. Preferably, prior to application, the microspheres are treated with a fluorochemical compound as disclosed in U.S. Pat. No. 3,222,204 (Weber).

If the opaque material is applied by extrusion of a heated thermoplastic resin, the microspheres can be applied to the opaque material, which can then be heated to its softening temperature prior to pressing microspheres into place. The microspheres may be pressed into place by passing through a presser, such as a pair of rolls, that presses the microspheres into opaque layer 14 (FIG. 1). It is important that the opaque layer 14 be made sufficiently soft to allow microspheres 1 to be pressed into opaque layer 14 and into contact with surface 3. The process must form optically transparent apertures, without requiring an amount of force that would cause damage to microspheres 1 or surface 3 of substrate 12. For example, if substrate 12 is glass, care would have to be taken not to break it. If substrate 12 is a polymeric film and microspheres 1 are glass, care should be taken not to press microspheres 1 into substrate 12 with such force as to cause microsphere impressions in substrate 12.

Figure 4:
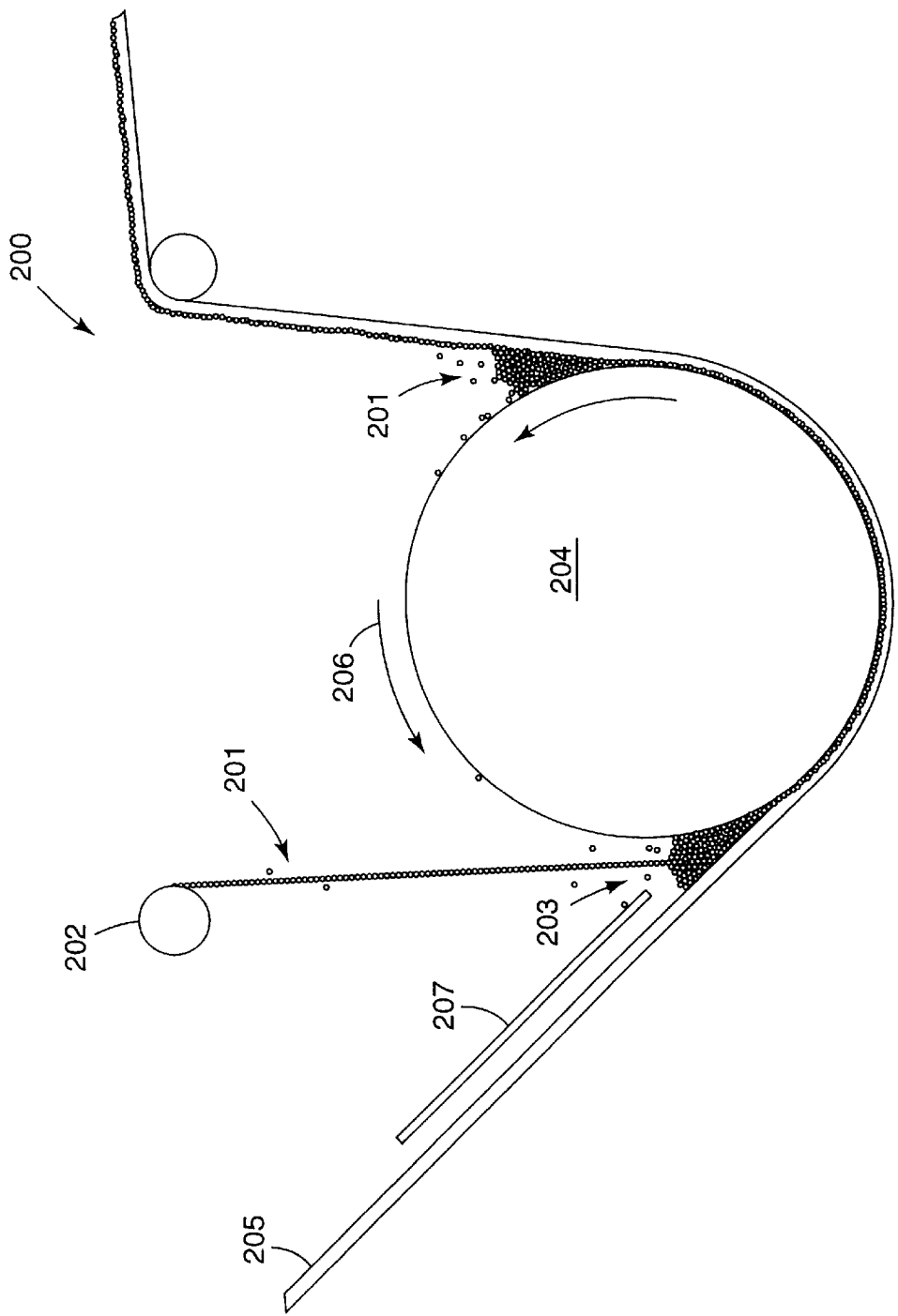
FIG. 4 shows a schematic of a bead applicator according to the present invention.

Referring to FIG. 4, an alternative method of coating the microspheres involves use of the bead applicator 200. Using this applicator, a sufficient quantity of microspheres 201 are placed into bead hopper 202 and dispensed at a rate to ensure formation of a rolling bank 203 of microspheres at the ingoing nip point of pack roll 204. Substrate 205 coated with opaque matrix, which is typically in a liquid or substantially undried state, is passed underneath pack roll 204 with multiple layers of glass microspheres 201 between it and the pack roll 204. Web tension, for example, presses the glass microspheres into the opaque matrix on the substrate 205 as it passes underneath the pack roll 204. The multiple layers allow the web tension to equalize the pressure applied to the various diameter microspheres. In this way, a monolayer of embedded microspheres is formed wherein the apex of a majority of, and typically substantially all, the microspheres are in direct contact with the substrate underlying the opaque matrix. This is significant in that it allows for a very high amount of transmitted light to pass through the microspheres and the substrate without being absorbed by the opaque matrix.

Excess microspheres 201 fall off of the outgoing substrate and cascade along line 206 over the top of pack roll 204 and back into the rolling bank 203 of microspheres. The substrate having the microspheres coated thereon is then passed through a drying oven as described above and wound onto a roll for further handling. Optionally, the bead applicator 200 includes a deflector 207 to prevent extraneous microspheres from impacting the substrate 205 prior to the substrate 205 coming into contact with the rolling bank 203.

The pack roll 204 can be made of a variety of materials, such as steel, rubber, ceramic, etc. Such material and the conditions of tension and rate of rotation of the pack roll 204, etc., can vary depending on the desired result. Such choices can be made by one of skill in the art without undue experimentation.

In these dry coating methods of application, typically, the microspheres are dry and are dropped onto a hot, tacky thermoplastic coating or a tacky, partially dried solvent coating, or a coating that is liquid with a very thin dry skin covering the liquid. In both cases the packing is about 65–85%, as compared to a theoretical optimum packing density of 91%.

The invention is further illustrated by the following examples, but the particular materials and amounts thereof recited in these examples, as well as other conditions and details, should not be construed to unduly limit this invention.

EXAMPLES

Index of Refraction

The Index of Refraction was measured by the Becke Line method, which is disclosed in F. Donald Bloss; "An Introduction to the Methods of Optical Crystallography"; Holt, Rinehart and Winston; New York; 47–55 (1961), the disclosure of which is incorporated herein by reference.

Percent Defects

The defect level was measured by counting the microspheres and the respective defects of a microsphere sample under an optical microscope. The percent defects refers to the total number of microspheres that contain bubbles, possess odd shapes, are opaque, or form cullet.

Flow

Flow can be measured by pouring a quantity of microspheres into a glass container and noting the behavior of the microspheres as one tilts the container. Pour flow behavior is characterized by microspheres that cascade in pulses. Good flow behavior is characterized by microspheres that move in a continuous fashion as the jar is tilted.

Microsphere Size and Size Distribution

Microsphere size and size distribution was measured using a Coulter LS100 laser particle size analyzer.

Example 1

The following raw materials were blended 14.03% $TiO_2$, 28.96% $BaCO_3$, 22.62% sodium silicate (23% $SiO_2$: 77% $Na_2O$), 13.57% anhydrous borax, 3.62% $NaNO_3$, 2.71% $Na_2CO_3$, 3.62 $K_2CO_3$, 9.05% $SiO_2$ and 1.81% $Li_2CO_3$. The raw batch was continuously fed into a furnace heated to a temperature above 1200° C. At the opposite end of the furnace a drain was provided from which the low viscosity molten glass exited and was atomized and quenched with heated high pressure air as is commonly done (40 to 60 psi, 500° F. to 1000° F. air temperature). The liquid glass was observed to be extremely fluid (i.e. like water) as it exited the furnace. Such a furnace and atomization device is described in U.S. Pat. No. 3,150,947 (Bland). This yields a glass with the following theoretical oxide composition, based on the weights of the starting materials: 16.1% $TiO_2$, 25.8% BaO, 10.77% $B_2O_3$, 14.1% $Na_2O$, 2.84% $K_2O$, 1.18% $Li_2O$ and 30.4% $SiO_2$. The glass microspheres were collected and those having the desired size of less than 150 $\mu$m and greater than approximately 35 $\mu$m were removed by screening. The glass microspheres of the desired size were subsequently passed through a methane/air burner (with a slightly oxidizing flame) to further refine the glass and convert the majority of the glass microspheres into microspheres.

The glass microspheres were subsequently screened to the desired size range and also to remove any contamination and were subsequently washed with water and surface treated with VOLAN methacrylato chromic chloride (available from Zaclon Inc., Cleveland, Ohio). The water washing step was performed by placing the desired quantity of glass microspheres into a suitably sized tank into which water was slowly percolated from the bottom and allowed to overflow out the top. The microspheres were allowed to be washed for approximately 20 minutes using a water flow rate slow enough to prevent elutriation of the microspheres at which time the water was removed by allowing it to drain and by pulling a vacuum on the bottom of the container. At this point the bottom of the container was sealed and a solution composed of 0.44% VOLAN methacrylato chromic chloride in deionized water was added to the top. The microspheres were allowed to soak in the solution for approximately 20 minutes at which point the solution was removed again by the action of a vacuum. The solution was added in an amount of 8 gallons per 500 pounds of microspheres. The wet cake of microspheres was subsequently dried in a dryer and screened to remove any contamination.

The microspheres were subsequently surface treated with 3M SCOTCHBAN paper protector FC414 fluorochemical (available from 3M Company, St. Paul, Minn.) by mixing a solution containing 1.06% of the FC414 fluorochemical in deionized water at a rate of 16.8 ml/lb of glass microspheres in a screw auger. The auger blends and mixes the solution and microspheres and transports them to a dryer where the mixture is dried and the surface treated microspheres were once again screened to remove contamination.

The resulting microspheres had a defect level of less than 15% without any subsequent sorting out of the defective particles, a refractive index of 1.66, a good flow rating, and an average size of between 63 $\mu$m and 65 $\mu$m and a size range of between 38 $\mu$m and 40 $\mu$m.

Example 2

A glass batch was made by blending the following dry powders: 11.24% $TiO_2$, 27.16% $BaCO_3$, 23.41% sodium silicate, 14.05% anhydrous borax, 3.75% $NaNO_3$, 3.07% $Na_2CO_3$, 5.62 $K_2CO_3$, 9.37% $SiO_2$ and 2.34% $Li_2CO_3$. This yielded a glass with the following oxide composition: 13.04% $TiO_2$, 24.49% BaO, 11.28% $B_2O_3$, 14.94% $Na_2O$, 4.44% K$_2$O, 1.10% Li$_2$O and 31.79% SiO$_2$. The raw materials were put in a platinum crucible and subsequently placed into a furnace which had been preheated to 1350° C. The materials were observed to melt readily and form a very fluid melt (i.e., like water). The crucible was allowed to sit for a total of fifteen minutes inside the furnace at which point the crucible was removed and glass microspheres formed directly from the the melt by pouring liquid glass directly into a stream of high velocity air source which was surrounded by a methane/air burner as described above. The index of refraction was determined to be 1.63.

Example 3

A glass batch was made by blending the following dry powders: 14.09% TiO$_2$, 28.18% BaCO$_3$, 22.73% sodium silicate, 13.64% anhydrous borax, 3.64% NaNO$_3$, 2.73% Na$_2$CO$_3$, 3.64 K$_2$CO$_3$, 9.09% SiO$_2$ and 2.27% Li$_2$CO$_3$. This yielded a glass with the following oxide composition: 16.23% TiO$_2$, 25.22% BaO, 10.87% B203, 14.22% Na$_2$O, 2.85% K$_2$O, 1.06% Li$_2$O and 30.62% SiO$_2$. The raw materials were put in a platinum crucible and subsequently placed into a furnace which had been preheated to 1350° C. The materials were observed to melt readily and form a very fluid melt (i.e., like water). The crucible was allowed to sit for a total of fifteen minutes inside the furnace at which point the crucible was removed and glass microspheres formed directly from the the melt by pouring liquid glass directly into a stream of high velocity air source which was surrounded by a methane/air burner as described above. The index of refraction was determined to by 1.65.

The complete disclosures of all patents, patent documents, and publications, are incorporated herein by reference as if individually incorporated. It will be appreciated by those skilled in the art that various modifications can be made to the above described embodiments of the invention without departing from the essential nature thereof. The invention is intended to encompass all such modifications within the scope of the appended claims.

What is claimed is:

1. A projection screen comprising a plurality of glass microspheres in optical contact with a substrate and embedded in an opaque matrix;
wherein the glass microspheres:
  have an index of refraction of no greater than about 1.70;
  comprise, on a theoretical oxide basis based on the amount of starting materials:
    greater than about 5 wt-% of an alkali metal oxide selected from the group consisting of Na$_2$O, K$_2$O, Li$_2$O, and mixtures thereof;
  no greater than about 40 wt-% SiO$_2$; and
  no less than about 10 wt-% TiO$_2$; and
  as produced have less than about 15% defects in a population.

2. The projection screen of claim 1 wherein the glass microspheres comprise, on a theoretical oxide basis based on starting materials:
  no greater than about 40 wt-% SiO$_2$;
  no less than about 10 wt-% TiO$_2$;
  no less than about 5 wt-% B$_2$O$_3$;
  no less than about 20 wt-% of an alkaline earth modifier selected from the group consisting of BaO, SrO, and mixtures thereof; and
  greater than about 5 wt-% of an alkali metal oxide selected from the group consisting of Na$_2$O, K$_2$O, Li$_2$O, and mixtures thereof.

3. The projection screen of claim 1 wherein the glass microspheres comprise, on a theoretical oxide basis based on starting materials:
  no greater than about 31 wt-% SiO$_2$;
  no less than about 15 wt-% TiO$_2$;
  no less than about 10 wt-% B$_2$O$_3$;
  no less than about 25 wt-% of an alkaline earth modifier selected from the group consisting of BaO, SrO, and mixtures thereof; and
  no less than about 10 wt-% of an alkali metal oxide selected from the group consisting of Na$_2$O, K$_2$O, Li$_2$O, and mixtures thereof.

4. The projection screen of claim 1 wherein the microspheres have an index of refraction of about 1.50 to about 1.70.

5. The projection screen of claim 1 wherein the microspheres comprise Li$_2$O.

6. The projection screen of claim 5 wherein the microspheres comprise, on a theoretical oxide basis based on starting materials, at least about 0.25 wt-% Li$_2$O.

7. The projection screen of claim 1 wherein the microspheres are prepared from a composition that melts below a temperature of about 1350° C.

8. The projection screen of claim 1 wherein the microspheres are coated with a flow control agent.

9. A projection screen comprising a plurality of glass microspheres in optical contact with a substrate and embedded in an opaque matrix; wherein the glass microspheres:
  have an index of refraction of no greater than about 1.70;
  comprise, on a theoretical oxide basis based on the amount of starting materials:
    no greater than about 40 wt-% SiO$_2$;
    no less than about 10 wt-% TiO$_2$;
    no less than about 5 wt-% B$_2$O$_3$;
    no less than about 20 wt-% of an alkaline earth modifier selected from the group consisting of BaO, SrO, and mixtures thereof; and
    greater than about 5 wt-% of an alkali metal oxide selected from the group consisting of Na$_2$O, K$_2$O, Li$_2$O, and mixtures thereof.

10. A film comprising a plurality of glass microspheres disposed on a substrate and embedded in an opaque matrix; wherein the glass microspheres:
  have an index of refraction of no greater than about 1.70;
  comprise, on a theoretical oxide basis based on the amount of starting materials:
    greater than about 5 wt-% of an alkali metal oxide selected from the group containing of Na$_2$O, K$_2$O, Li$_2$O, and mixtures thereof, with the proviso that Li$_2$O is present;
  no greater than about 40 wt-% SiO$_2$; and
  no less than about 10 wt-% TiO$_2$; and
  as produced have less than about 15% defects in a population.

11. A glass microsphere comprising, on a theoretical oxide basis, based on starting materials:
  no greater than about 40 wt-% SiO$_2$;
  no less than about 10 wt-% TiO$_2$;
  no less than about 5 wt-% B$_2$O$_3$;
  no less than about 20 wt-% of an alkaline earth modifier selected from the group containing of BaO, SrO, and mixtures thereof; and
  greater than about 5 wt-% of an alkali metal oxide selected from the group containing of Na$_2$O, K$_2$O, Li$_2$O, and mixtures thereof, with the proviso that Li$_2$O is present.

12. The glass microsphere of claim 11 comprising:

no greater than about 31 wt-% $SiO_2$;

no less than about 15 wt-% $TiO_2$, no less than about 10 wt-% $B_2O_3$;

no less than about 25 wt-% of an alkaline earth modifier selected from the group containing of BaO, SrO, and mixtures thereof; and no less than about 10 wt-% of an alkali metal oxide selected from the group containing of $Na_2O$, $K_2O$, $Li_2O$, and mixtures thereof.

13. The microsphere of claim 11 which has a diameter of less than about 150 micrometers.

14. The glass microsphere of claim 11 which has an index of refraction of about 1.50 to about 1.70.

15. The glass microsphere of claim 11 comprising, on a theoretical oxide basis based on starting materials, at least about 0.25 wt-% $Li_2O$.

16. The glass microsphere of claim 11 which is prepared from a composition that melts below a temperature of about 1350° C.

17. The glass microsphere of claim 11 further comprising a coating comprising a flow control agent.

18. A noncalcium-containing glass microsphere comprising, on a theoretical oxide basis, based on starting materials:

no greater than about 40 wt-% $SiO_2$;

no less than about 10 wt-% $TiO_2$;

no less than about 5 wt-% $B_2O_3$;

no less than about 20 wt-% of an alkaline earth modifier selected from the group containing of BaO, SrO, and mixtures thereof; and greater than about 5 wt-% of an alkali metal oxide selected from the group containing of $Na_2O$, $K_2O$, $Li_2O$, and mixtures thereof.

19. A method of making a film for use in a projection screen, the method comprising:

providing a substrate having an opaque matrix disposed thereon; and applying glass microspheres from a rolling bank of microspheres onto the opaque matrix under conditions effective to produce microspheres in optical contact with the substrate and embedded in the opaque matrix.

20. The method of claim 19 wherein applying glass microspheres from a rolling bank comprises:

contacting the opaque matrix on the substrate with sufficient glass microspheres to form multiple layers of glass microspheres between the substrate and a pack roll;

pressing the glass microspheres into the opaque matrix on the substrate to form a monolayer of embedded microspheres, wherein the apex of a majority of the microspheres are in direct contact with the substrate underlying the opaque matrix.

* * * * *

UNITED STATES PATENT AND TRADEMARK OFFICE
CERTIFICATE OF CORRECTION

PATENT NO. : 6,204,971 B1
DATED : March 20, 2001
INVENTOR(S) : Morris et al.

It is certified that error appears in the above-identified patent and that said Letters Patent is hereby corrected as shown below:

Column 6,
Line 51, delete "$AS_2O_3$" and insert therefore -- $As_2O_3$ --.

Column 13,
Line 19, delete "B203" and insert therefore -- $B_2O_3$ --.

Column 14,
Lines 6, 48, 62 and 65, delete "containing" and insert therefore -- consisting --.

Column 15,
Line 10, delete "containing" and insert therefore -- consisting --.

Column 16,
Lines 3 and 6, delete "containing" and insert therefore -- consisting --.

Signed and Sealed this

Seventh Day of May, 2002

*Attest:*

*Attesting Officer*

JAMES E. ROGAN
*Director of the United States Patent and Trademark Office*